United States Patent

[11] 3,539,066

| [72] | Inventor | Roy S. Stevenson<br>501 N. Douglas Blvd., Midwest City,<br>Oklahoma 73130 |
|---|---|---|
| [21] | Appl. No. | 769,980 |
| [22] | Filed | Oct. 23, 1968 |
| [45] | Patented | Nov. 10, 1970 |

[54] BOAT TRAILER AND DOCK
3 Claims, 7 Drawing Figs.

[52] U.S. Cl. .................................................... 214/506;
9/1; 280/414
[51] Int. Cl. ...................................................... B60p 3/10
[50] Field of Search ............................................ 214/505,
506, 84; 280/414; 9/1

[56] References Cited
UNITED STATES PATENTS

| 2,822,100 | 2/1958 | Pesta | 214/84X |
| 2,823,817 | 2/1958 | Holsclaw | 214/506 |
| 2,889,945 | 6/1959 | Holsclaw | 214/505X |
| 3,176,865 | 4/1965 | Faul et al. | 214/505 |
| 3,262,139 | 7/1966 | Campbell | 214/84X |
| 3,438,524 | 4/1969 | Snodgrass | 214/505 |

*Primary Examiner*—Albert J. Makay
*Attorney*—Robert K. Rhea

ABSTRACT: A wheeled trailer, having a platform overlying its frame, supports a boat while traveling. The rearward end of the trailer frame is provided with a boat bow receiving and nesting recess opened for admission of the boat, when the trailer is backed into the water, by a boat supporting bolster normally extending transversely across the recess which is pivoted to an out of the way position.

'atented Nov. 10, 1970

ROY S. STEVENSON
INVENTOR.

BY

Robert K. Rhea
AGENT

BOAT TRAILER AND DOCK

BACKGROUND OF THE INVENTION

The present invention relates to boating and more particularly to a combination boat trailer and dock.

As a result of the increased interest in water sports and boating there are frequently insufficient docking facilities available for the boat users. There is usually sufficient beach or bank areas surrounding each body of water from which boats, carried on trailers, may be launched, however, because of the relatively shallow water at a beach it is not convenient for fully dressed persons to enter a boat when launched at a beach area or to leave a boat after a trip on the water for the reason a boat ordinarily cannot be floated in the shallow water.

With my invention it is possible to back the trailer and boat toward and into the water's edge at a beach area or substantially any bank area and launch the boat in a conventional manner. The trailer then forms a boat docking means.

A combination boat trailer and dock is disclosed by the patent to Campbell U.S. Pat. No. 3,262,139 which features deck means at the rearward end portion of his trailer wherein the deck means is rotated to a vertical position after the boat is launched but does not provide a dock which nests a portion of a boat. My invention on the other hand, provides a boat bow receiving and nesting recess extending longitudinally into the rearward end portion of my trailer frame which will securely retain and shield a boat during a storm, or the like, and which positions the boat with respect to the trailer frame in such a manner that entry or exit from the boat is more easily and safely accomplished than is possible were the boat to be positioned with its longitudinal axis parallel with respect to the edge of a dock, or the like. This combination boat trailer and dock is particularly adaptable for the use of a person who prefers a location adjacent a body of water not equipped with boat launching and docking facilities for the reason that this trailer features a tilting action permitting greater ease of boat launching and loading by one person without entering the water in addition to providing a boat dock facility after the boat is launched.

SUMMARY OF THE INVENTION

A two-wheeled trailer adapted to be towed includes a frame which is mounted on a transverse axle for vertical pivoting movement of its respective end portions. The trailer is backed into the water for launching the boat and after the boat is launched the tongue end portion of the trailer may be anchored to the bank and a boat supporting bolster is pivotally moved to a position parallel with respect to the longitudinal axis of the trailer which opens a boat bow receiving and nesting recess. The trailer is returned to boat supporting position by positioning the bolster transversely of the bow receiving recess and loading the boat on the trailer in a conventional manner.

A pivotally connected tongue, at the forward end of the frame, tilts the trailer frame about the axle to position the rearward end of the frame within the water for unloading and loading the boat thereby providing a boat trailer means which can be used in areas not having a boat launching ramp and which, when anchored to the bank provides boat docking facilities for both entering and leaving the boat and securing the boat when not in use.

The principal object of this invention is to provide a combination boat trailer and dock.

DESCRIPTION OF THE PREFERRED EMBODIMENT

Figure 1:
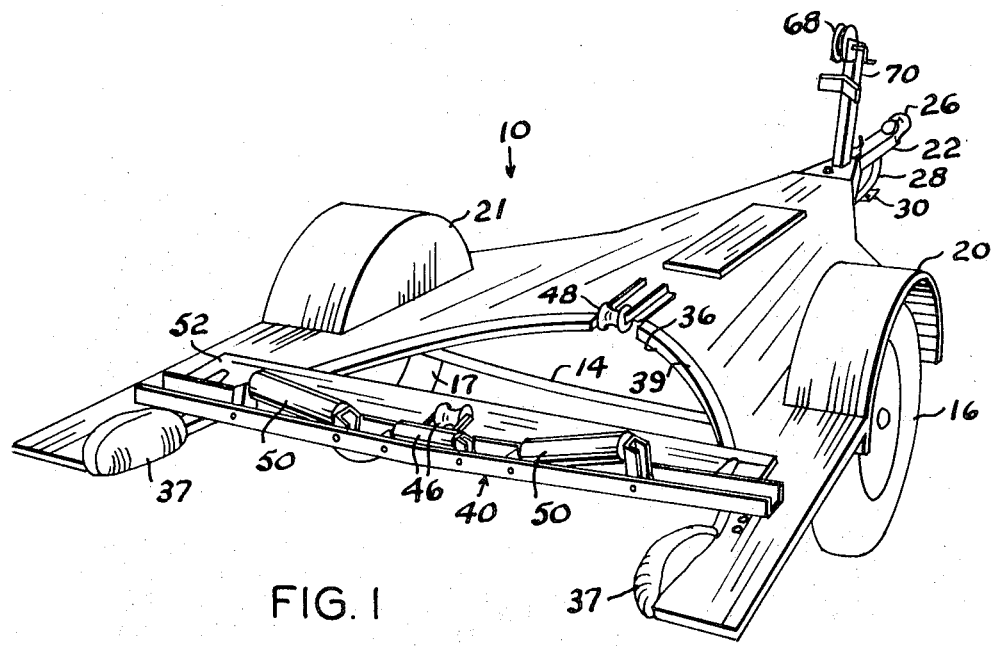
FIGS. 1 and 2 are perspective views of the trailer.

Like characters of reference designate like parts in those figures of the drawings in which they occur.

In the drawings:

The reference numeral 10 indicates the device, as a whole, comprising a generally horizontal A-frame 12 supported by a transverse axle 14 journaling wheels 16 and 17 at its respective ends. A platform 18 overlies the A-frame 12 and is recessed around fender-like wells 20 and 21 shielding the upwardly disposed arc of the respective wheels 16 and 17. The opposing sides of the platform 18 converge forwardly in cooperation with the sides of the frame 12. The forward end of the frame is provided with a tongue member 22 which is pivotally connected to the A-frame adjacent its forward end by a spindle 24 for vertical pivoting movement of the tongue 22. The forward free end of the tongue is provided with a trailer hitch ball receiving socket 26 for towing the trailer in a conventional manner. A loop-like bracket 28 is connected in depending relation with the depending surface of the tongue 22 for supporting the trailer frame as hereinafter described.

An apertured lateral projection 30, secured to the lowermost portion of the bracket 28, removably receives a stake pin 32 (FIGS. 4 and 5) for anchoring the device adjacent a body of water as presently explained.

A locking lever 34, pivotally secured to the tongue 22 adjacent the forward end edge of the frame 12, releaseably engages the latter to maintain the tongue in the plane of the frame 12 for towing purposes. The other or rearward end portion of the trailer platform 18 is provided with a substantially V-shaped recess 36 extending longitudinally inward of the frame between the frame side members and terminating substantially equidistant from the rearward end of the frame and above the position of the axle 14. The recess is cooperatively shaped and the edges of the frame forming it are padded, as at 37 and 39, to loosely nest the bow of a boat, indicated at 38, as hereinafter explained.

A boat supporting bolster 40 normally extends transversely across the recess 36 and is loosely connected, at one end, to one side of the platform by a pin 42 for pivoting movement of its other end portion toward and away from an overlying position with respect to the wheel 17 and its well 21 to open and close the recess 36. The free end portion of the bolster 40 is removably secured to the other side of the frame by a bolt 44. The bolster 40 is centrally provided with keel contacting guide and support rollers 46. Similarly a keel guiding and supporting roller 48 is connected with the upper surface of the platform 18 adjacent the apex of the V-shaped recess 36. Hull contacting and supporting rollers 50 are adjustably secured to the bolster outwardly of the keel rollers 46 in the manner hereinafter explained.

An access platform, comprising a plank 52, is hingedly connected in parallel close spaced relation to one side of the bolster for the purposes presently explained.

In transporting the boat along a roadway it is necessary that the hull of the boat be supported more firmly than the keel to prevent a breaking action of the hull away from the keel as a result of a primary support contacting the keel prior to a secondary support contacting the boat hull 53. For this reason I have adjustably connected the hull rollers 50 to the bolster 40. I have accomplished this by forming a roller supporting and journaling bracket 54 comprising substantially vertically disposed channel members 56 and 58 interconnected by a cross member or web 60 and vertically movable through side members 62 forming the bolster 40. Bolt and nut means 64, extending through suitable slots in the respective legs of the channels 56 and 58 and selected apertures in the bolster sides 62, permits angular and vertical adjustment of the rollers 50 with respect to the generally horizontal plane of the bolster 40 so that a peripheral portion of each roller 50 may be positioned against the depending surface of the boat hull and contactably support the boat hull so that its keel at least lightly contacts the keel supporting rollers 46 and 48 after the boat has been loaded on the trailer.

OPERATION

Figure 2:
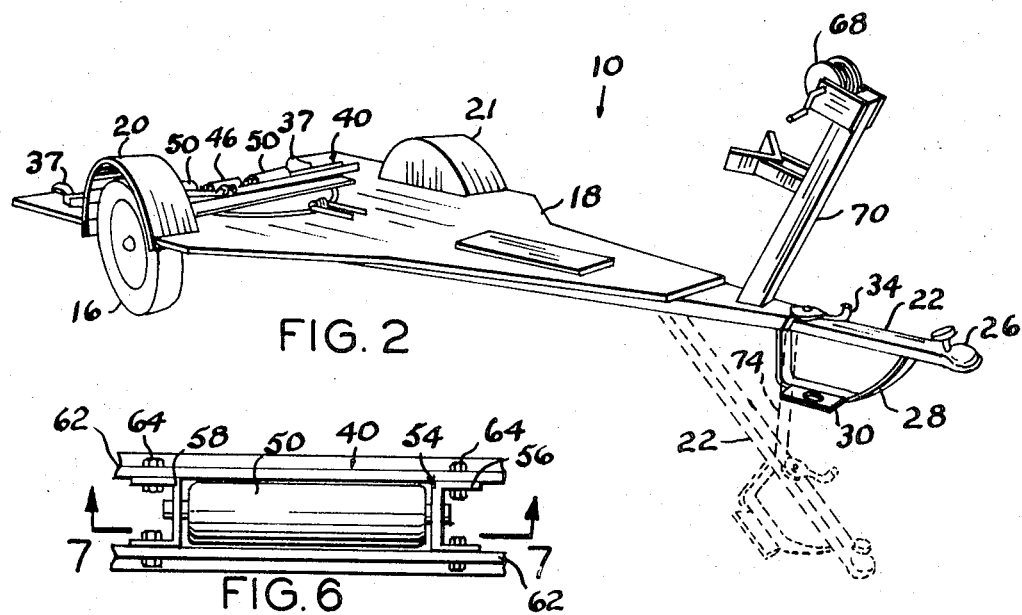
Figure 6:
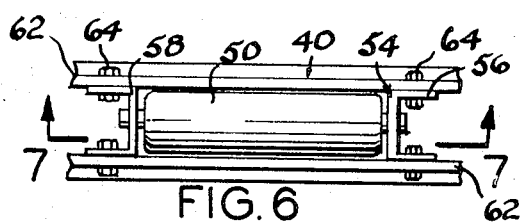
FIG. 6 is a fragmentary top view of one of the hull supporting rollers.
Figure 7:
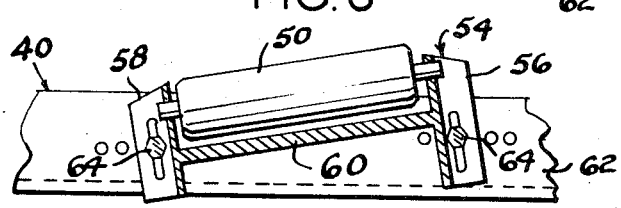
FIG. 7 is a vertical cross-sectional view taken substantially along the line 7–7 of FIG. 6.
Figure 4:
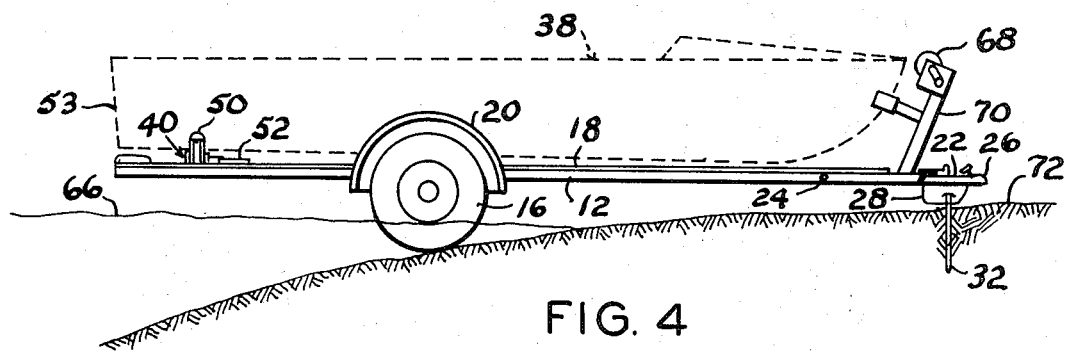
FIG. 4 is a side elevational view, partially in section of the device in boat supporting position adjacent a water's edge, the boat being shown by dotted lines.
Figure 5:
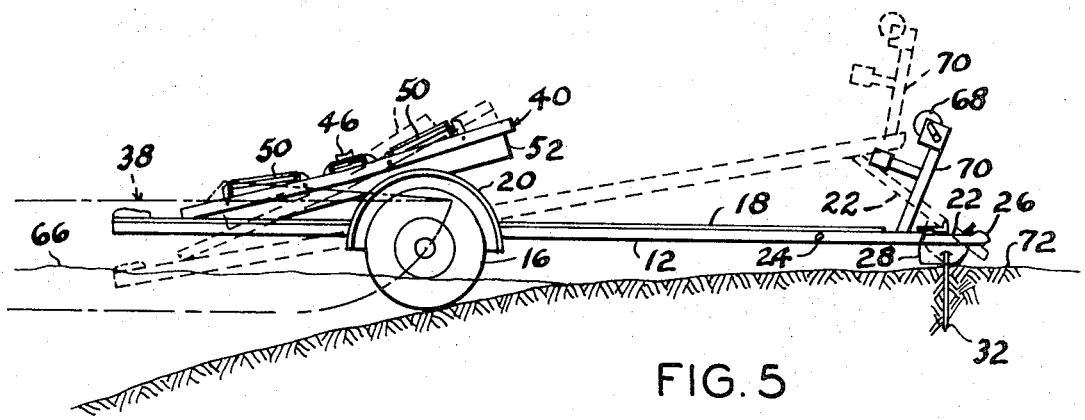
FIG. 5 is a view similar to FIG. 4, illustrating, by dotted lines, the tilting action of the trailer for loading and unloading a boat and illustrating, by phantom lines, substantially the position of a boat with respect to the trailer when the latter is used as a boat dock.
Figure 3:
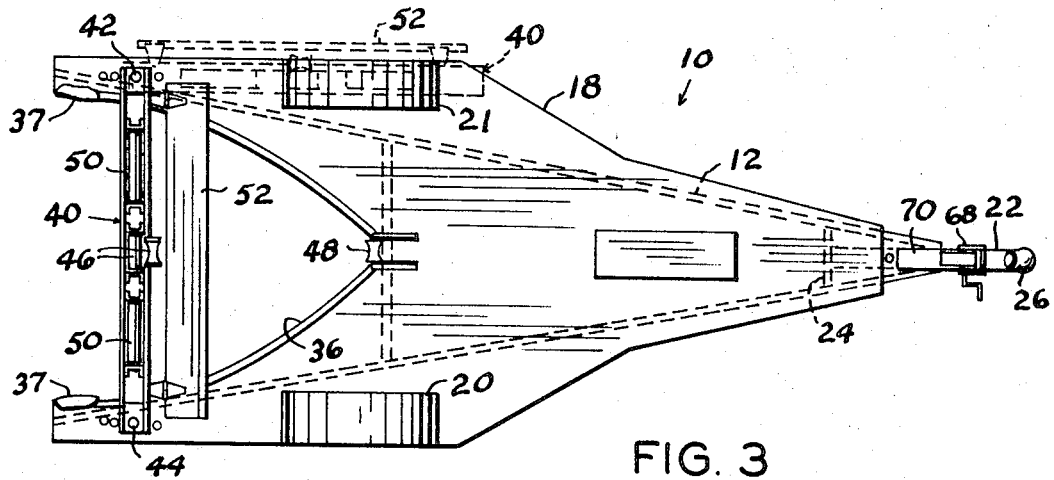
FIG. 3 is a top plan view thereof.

Assuming that the boat 38 is loaded on the trailer, the boat is backed into the water indicated by the wavy line 66. The forward end or bow of the boat is normally connected with a hand operated winch 68 mounted on an upstanding standard 70 longitudinally adjustably secured to the forward end of the frame 12. The trailer may be backed into the water until the boat is floated or positioned substantially, as shown in FIG. 4, and then tilted about the axis of the axle 14 to substantially the dotted line position of FIG. 5 which floats the rearward end portion of the boat and renders the launching action more easily accomplished. After the boat has been launched the stake pin 32 is driven through the aperture in the lug 30 to anchor the forward end of the trailer in the soil 72 adjacent the water's edge. The bolster connecting bolt 44 is released and the bolster is manually pivoted to its dotted line position of FIG. 3 overlying the wheel 17 to open the boat dock recess 36. When the boat bow is within the recess 36, as shown by phantom lines (FIG. 5), the platform forms a dock surface which permits the boat users to walk on and enter and leave the boat 38 from the dock surface. When it is desired to reload the boat, the bolster is positioned, as shown by solid lines (FIG. 3), and the operator may then connect the winch line to the boat by standing on the plank 52 and centrally positioning the boat so that the keel is aligned with the rollers 56. Thereafter operation of the winch 68 pulls the boat 38 up on the trailer by the rolling contact between the rollers 46 and boat keel. Obviously the loading action may be enhanced by releasing the tongue locking lever 34 so that the boat frame and platform will be tilted to its dotted line position of FIG. 5. The trailer frame and platform may be maintained in this tilted position by a lock lever 74 removably connected between the forward end of the frame and the tongue 22 (FIG. 2).

I claim:

1. A combination boat trailer and dock, comprising: a wheeled trailer frame having a transverse axle journaling a pair of wheels and having a platform overlying said frame, said trailer frame having a rear end and a front end adapted to be towed, said rear end having a boat bow receiving and nesting recess; means on said platform including a bolster pivotally connected at one end to said frame at one side of said recess for substantially horizontal pivoting movement of its other end portion toward and away from a transverse position across the recess for supporting a boat; keel and hull supporting rollers mounted on said bolster; and support means forming a part of said trailer frame front end for pivoting said trailer frame ends vertically about the horizontal axis of said axle.

2. Structure as specified in claim 1 including an access platform hingedly connected longitudinally to that side of said bolster parallel with said axle.

3. Structure as specified in claim 2 in which said support means includes a tongue hingedly connected to the forward end portion of said frame for vertical pivoting movement; and a locking lever connecting the forward end portion of said tongue with the forward end of said frame whereby said tongue may be maintained within the plane of said frame or angularly disposed downwardly thereof.